United States Patent
Lundahl et al.

(10) Patent No.: US 11,288,487 B2
(45) Date of Patent: Mar. 29, 2022

(54) CANCELLING OUT IMPAIRMENT DATA IN FINGERPRINT IMAGES

(71) Applicant: Fingerprint Cards AB, Gothenburg (SE)

(72) Inventors: Karl Lundahl, Gothenburg (SE); Erik Svensson, Gothenburg (SE); Morten Rolle Hansen, Hellerup (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/485,293

(22) PCT Filed: Feb. 7, 2018

(86) PCT No.: PCT/SE2018/050111
§ 371 (c)(1),
(2) Date: Aug. 12, 2019

(87) PCT Pub. No.: WO2018/151643
PCT Pub. Date: Aug. 23, 2018

(65) Prior Publication Data
US 2019/0377929 A1    Dec. 12, 2019

(30) Foreign Application Priority Data
Feb. 17, 2017   (SE) .................................. 1750159-4

(51) Int. Cl.
*G06K 9/00*    (2006.01)
*G06K 9/40*    (2006.01)

(52) U.S. Cl.
CPC ....... *G06K 9/00067* (2013.01); *G06K 9/0002* (2013.01); *G06K 9/40* (2013.01)

(58) Field of Classification Search
CPC .... G06K 9/00067; G06K 9/0002; G06K 9/40; G06K 9/00
See application file for complete search history.

(56) References Cited

U.S. PATENT DOCUMENTS 6,330,345 B1 * 12/2001 Russo .................. G06K 9/0002
348/218.1
7,020,591 B1 * 3/2006 Wei .................... G06K 9/00067
382/190

(Continued)

FOREIGN PATENT DOCUMENTS

| WO | 2016010470 A1 | 1/2016 |
| WO | 2016162231 A1 | 10/2016 |
| WO | 2017095304 A1 | 6/2017 |

OTHER PUBLICATIONS

Authentication of Fingerprint Scanners by Vladimir I. Ivanov and John S. Baras (Year: 2011).*

(Continued)

*Primary Examiner* — Edward F Urban
*Assistant Examiner* — Wassim Mahrouka
(74) *Attorney, Agent, or Firm* — RMCK Law Group, PLC

(57) ABSTRACT

The invention relates to a method of a fingerprint sensing system of enabling cancelling out impairment data present in an image captured by a fingerprint sensor of the fingerprint sensing system, a method of a fingerprint sensing system of cancelling out impairment data present in an image captured by a fingerprint sensor of the fingerprint sensing system, and a fingerprint sensing system performing the methods.

19 Claims, 6 Drawing Sheets

(56) References Cited

U.S. PATENT DOCUMENTS

| | | |
|---|---|---|
| 9,600,707 B1* | 3/2017 | Ramberg .............. G06F 3/0443 |
| 2002/0034337 A1 | 3/2002 | Shekter |
| 2006/0138574 A1 | 6/2006 | Saito et al. |
| 2006/0257047 A1* | 11/2006 | Kameyama ........ G06K 9/00248 |
| | | 382/275 |
| 2009/0252386 A1 | 10/2009 | Dean et al. |
| 2012/0014570 A1* | 1/2012 | Abe ................... G06K 9/00067 |
| | | 382/124 |
| 2013/0135496 A1 | 5/2013 | Nomura |
| 2015/0022670 A1 | 1/2015 | Gozzini et al. |
| 2016/0012271 A1* | 1/2016 | Hansen .............. G06K 9/00087 |
| | | 382/124 |
| 2016/0044255 A1 | 2/2016 | Bewersdorf et al. |
| 2017/0068838 A1 | 3/2017 | Kravets et al. |
| 2017/0079624 A1 | 3/2017 | Wadhwa et al. |
| 2019/0011543 A1* | 1/2019 | Gidel ..................... G01S 17/10 |

OTHER PUBLICATIONS

PCT International Search Report and Written Opinion dated Apr. 27, 2018 for International Application No. PCT/SE2018/050111, 13 pages.

Wang, H. et al., "Phase Noise and Fundamental Sensitivity of Oscillator-Based Reactance Sensors," IEEE Transactions on Microwave Theory and Techniques, vol. 61, No. 5, May 2013, pp. 2215-2229.

Extended European Search Report dated Nov. 17, 2020 for EP Application No. 18754240.2, 8 pages.

* cited by examiner

CANCELLING OUT IMPAIRMENT DATA IN FINGERPRINT IMAGES

CROSS-REFERENCE TO RELATED APPLICATIONS

This application is a 371 U.S. National Stage of International Application No. PCT/SE2018/050111, filed Feb. 7, 2018, which claims priority to Swedish Patent Application No. 1750159-4, filed Feb. 17, 2017. The disclosures of each of the above applications are incorporated herein by reference in their entirety.

TECHNICAL FIELD

The invention relates to a method of a fingerprint sensing system of enabling cancelling out impairment data present in an image captured by a fingerprint sensor of the fingerprint sensing system, a method of a fingerprint sensing system of cancelling out impairment data present in an image captured by a fingerprint sensor of the fingerprint sensing system, and a fingerprint sensing system performing the methods.

BACKGROUND

Electronic devices such as smart phones, laptops, remote controls, tablets, smart cards, etc., may use fingerprint recognition e.g. to allow a user to access the device, to authorize transactions carried out using the electronic device, or to authorize the user for accessing a service via the electronic device.

Hence, the electronic device, being for example a smart phone, is equipped with a fingerprint sensor on which the user places her finger in order for the sensor to capture an image of the fingerprint and compare the recorded fingerprint with a pre-stored, authenticated fingerprint template. If the recorded fingerprint matches the pre-stored template, the user is authenticated and the smart phone will perform an appropriate action, such as transitioning from locked mode to unlocked mode, in which the user is allowed access to the smart phone.

For a fingerprint sensor that is based on e.g. a capacitive, optical or an ultra sonic detection signal from the finger, requirements on the materials present between the user's finger and the fingerprint sensing elements (known as pixels) of the sensor are high in terms of precision in thickness and material properties such as for instance dielectric homogeneity for capacitive sensors. In case of a capacitive sensor, when the user touches a fingerprint sensing area (covered by e.g. glass or ceramic) of the smart phone, a capacitor is formed between a surface of the fingerprint sensing area and the fingerprint sensor arranged inside the smart phone. By measuring the capacitance between the surface touched by the user and the sensor at each pixel, the fingerprint of the user may be derived from an image captured by the fingerprint sensor of the user's finger.

However, due to a number of reasons, impairment data in the form of static noise may be present in the image captured by the fingerprint sensor which renders the deriving of a fingerprint from a captured image more difficult.

For capacitive sensors, this type of static noise is referred to as capacitive static noise and may occur for instance due to impairments such as variations in the material stack-up height between the surface of the fingerprint sensing area and the fingerprint sensor, a damaged surface of the fingerprint sensing area in the form of for instance scratches, or due to impairments such as sensor warpage or imperfections in material properties. In order to eliminate capacitive static noise, sub-µm precision and extremely pure materials may be required. In a practical scenario, such precision in materials is difficult to achieve.

SUMMARY

An object of the present invention is to solve, or at least mitigate, this problem in the art and thus to provide an improved method of at least partly cancelling out impairment data in images captured by the fingerprint sensor.

This object is attained in a first aspect of the invention by a method of a fingerprint sensing system of enabling cancelling out impairment data present in an image captured by a fingerprint sensor of the fingerprint sensing system. The method comprises capturing an image of an object contacting the fingerprint sensor and detecting, from the captured image, impairment data caused by impairments that the fingerprint sensor is subjected to. Further, the method comprises fitting the detected impairment data to a selected mathematical model and storing the mathematical model to which the detected impairment data is fitted, wherein the model can be used subsequently for at least partly cancelling out impairment data present in an image captured by the fingerprint sensor.

This object is attained in a second aspect of the invention by a fingerprint sensing system comprising a fingerprint sensor and a processing unit, the fingerprint sensing system being configured to enabling cancelling out impairment data present in an image captured by a fingerprint sensor of the fingerprint sensing system. The fingerprint sensor is configured to capture an image of an object contacting the fingerprint sensor. The processing unit is configured to detect, from the captured image, impairment data caused by impairments that the fingerprint sensor is subjected to, fit the detected impairment data to a selected mathematical model, and store the mathematical model to which the detected impairment data is fitted, wherein the model can be used subsequently for at least partly cancelling out impairment data present in an image captured by the fingerprint sensor.

This object is attained in a third aspect of the invention by a method of a fingerprint sensing system of cancelling out impairment data present in an image captured by a fingerprint sensor of the fingerprint sensing system. The method comprises capturing an image of an object contacting the fingerprint sensor, acquiring a stored predetermined mathematical model representing impairment data present in the captured image, which impairment data is caused by impairments that the fingerprint sensor is subjected to, and using the acquired predetermined mathematical model to at least partly cancel out the impairment data present in the captured image.

This object is attained in a fourth aspect of the invention by a fingerprint sensing system comprising a fingerprint sensor and a processing unit, the fingerprint sensing system being configured to cancelling out impairment data present in an image captured by a fingerprint sensor of the fingerprint sensing system. The fingerprint sensor is configured to capture an image of an object contacting the fingerprint sensor. The processing unit is configured to acquire a stored predetermined mathematical model representing impairment data present in the captured image, which impairment data is caused by impairments that the fingerprint sensor is subjected to, and use the acquired predetermined mathematical model to at least partly cancel out the impairment data present in the captured image.

In the invention, during for instance manufacturing and testing of the fingerprint sensor, an object commonly referred to as a (flat) rubber stamp may be applied to a surface of a fingerprint sensing area of a host device implementing the fingerprint sensing system, such as the smart phone.

For a "perfect" sensor, mobile phone fingerprint sensing surface and material in between the sensing surface of the phone and the sensor itself, an image captured by the sensor of such a rubber stamp would be a uniformly black/grey, without any impairment data in the form of artefacts or noise present in the image, whereas in practice where the sensor, surface and material in between are "imperfect", impairment data forming some type of pattern may be present in the captured image.

For instance, impairment data forming a linear slope may be present in a captured image.

With the invention, an appropriately selected mathematical model is selected for representing such impairment data, for instance a first-order polynomial in coordinates x and y representing the captured image in a horizontal and vertical direction, respectively:

$$P1(x,y)=c0+c1*x+c2*y$$

where coefficients c0, c1 and c2 are selected such that the first order polynomial correctly represents the linear slope formed by the impairment data in the captured image.

Thus, the linear-slope impairment data is advantageously fitted to the above described first-order polynomial, which polynomial is stored for subsequent use as a mathematical model for representing corresponding impairment data present in a captured image. This is highly advantageous, as compared to storing a complete static noise image, storing a mathematical mode requires a very small storage space, such as less than 20 Bytes.

In an embodiment, the created and stored mathematical mode is fetched and used by the fingerprint sensing system during normal operation of authenticating a user in order to have the host device perform an appropriate action, such as transitioning from a locked state to an unlocked state in order to allow the user to access the host device.

In an embodiment, in case the impairment data is of an additive type, the processing unit of the fingerprint sensing system subtracts the impairment data represented by the acquired predetermined mathematical model from the impairment data present in the captured image, wherein the impairment data present in the captured image is cancelled out, and a "clean" image is obtained.

In a further embodiment, one or more sensor parameters may be adjusted, such as e.g. pixel sensitivity, for cancelling any impairment data present in a captured image.

Assuming for instance that the impairment data is a result of variation in the stack-up height of the material between the surface of the sensing area and the fingerprint sensor; since the attenuation of a sensed signal is greater at pixels where the stack-up is high, it may be possible to cancel out the impairment data at these pixels by increasing the pixel sensitivity accordingly. Hence, by appropriately controlling the sensor settings based on the predetermined mathematical model representing the impairment data, a "clean" fingerprint may advantageously be obtained by the fingerprint sensor.

It is further noted that the impairment data may be a result of variations in thickness in the material stack-up that in fact are intentionally created for industrial design purposes, such as e.g. concave or convex geometries (for instance the concave shape of the home button of older iPhone models).

It is envisaged that that different pixel sensitivities can be used for different locations of the pixel matrix of the sensor, where each location comprises at least one pixel, even though in practice a cluster of tens or hundreds of pixels is addressed with one pixel sensitivity while another cluster is addressed with another pixel sensitivity.

Further embodiments of the invention will be described in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
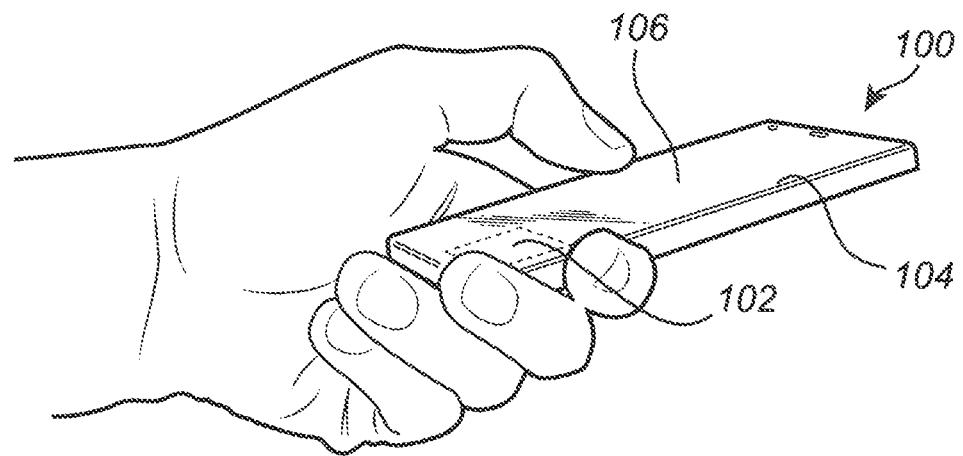
FIG. 1 shows an electronic device in the form of a smart phone in which the present invention may be implemented.

FIG. 1 shows an electronic device in the form of a smart phone 100 in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, smartwatches, etc., or any other type of present or future similarly configured device utilizing fingerprint sensing.

Figure 2:
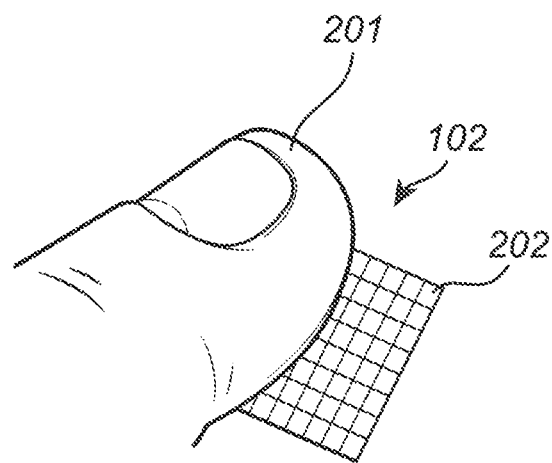
FIG. 2 shows a view of a fingerprint sensor onto which a user places the finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
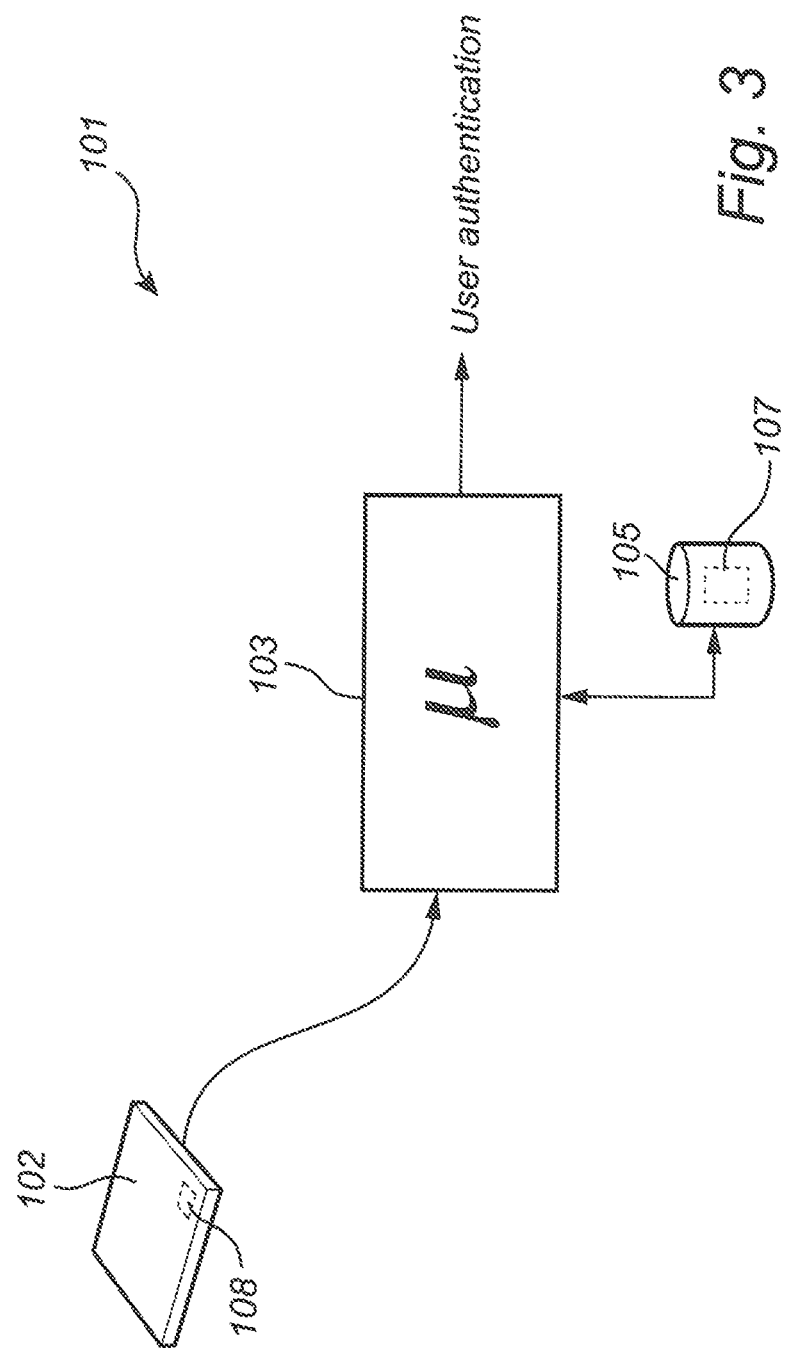
FIG. 3 shows a fingerprint sensor being part of a fingerprint sensing system according to an embodiment.

It is noted that the present invention is equally applicable to other fingerprint sensing technologies, such as e.g. optical or ultrasonic sensing, FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1. A local memory 108 such as a one-time programmable (OTP) is typically embedded in the sensor die.

Now upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 1o7. Alternatively, the computer program 107 may be transferred to 3o the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
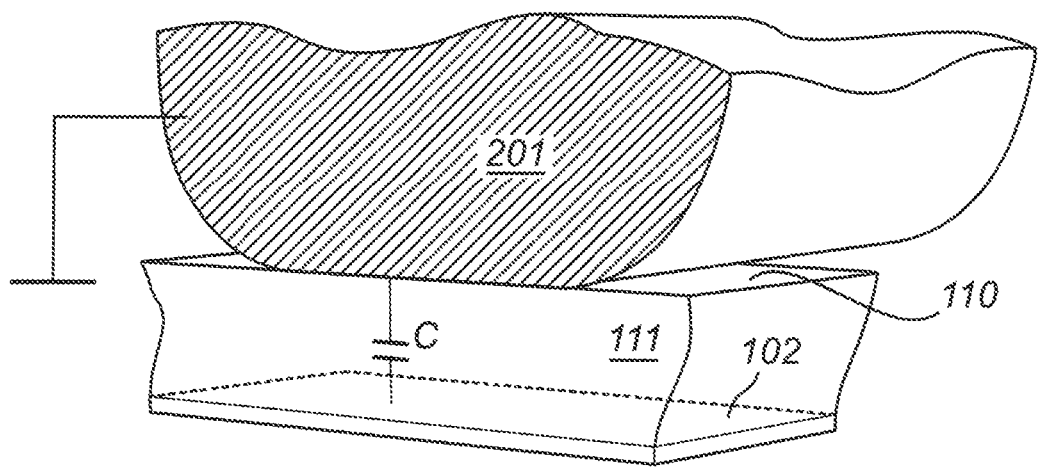
FIG. 4 illustrates the principle for capacitive fingerprint sensing.

FIG. 4 illustrates the principle for capacitive fingerprint sensing, as previously has been discussed. Upon a user contacting a surface 110 of a fingerprint sensing area (typically by touching the home button) of the smart phone with her finger 201, a capacitor C is formed between the surface 110 of the fingerprint sensing area and the fingerprint sensor 102 arranged inside the smart phone. The material 111 between the surface 110 and the fingerprint sensor 102 may be composed of e.g. glass or ceramic.

By measuring the capacitance between the surface 110 touched by the user and the sensor 102, the fingerprint of the user may be derived from an image captured by the fingerprint sensor 102 of the user's finger 201.

Due to various impairments, such as variations in the stack-up height of the material 111 between the surface 110 of the fingerprint sensing area and the fingerprint sensor 102, a damaged surface 110, sensor warpage, general imperfections in the properties of the material 111 capacitive static noise will be present in the images captured by the fingerprint sensor 102 which renders the deriving of a fingerprint from the captured images more difficult. Similar noise is also present in case of using optical or ultrasonic fingerprint sensing technologies.

It is known that by capturing one or more reference images in which static noise generated by these impairments is present, the static noise in subsequently captured images may be removed or mitigated using image processing.

These known methods involve storage of a complete static noise image for subsequent use in the fingerprint sensing system with the aim to cancel out capacitive static noise in a captured image.

With reference again to FIG. 4, during manufacturing and testing of the fingerprint sensor 102, an object commonly referred to as a (flat) rubber stamp may be applied to the surface 110 of the fingerprint sensing area of the smart phone instead of a real finger. This rubber stamp typically entirely covers the area 110, and correspondingly all pixels of the fingerprint sensor 102.

Figure 5:
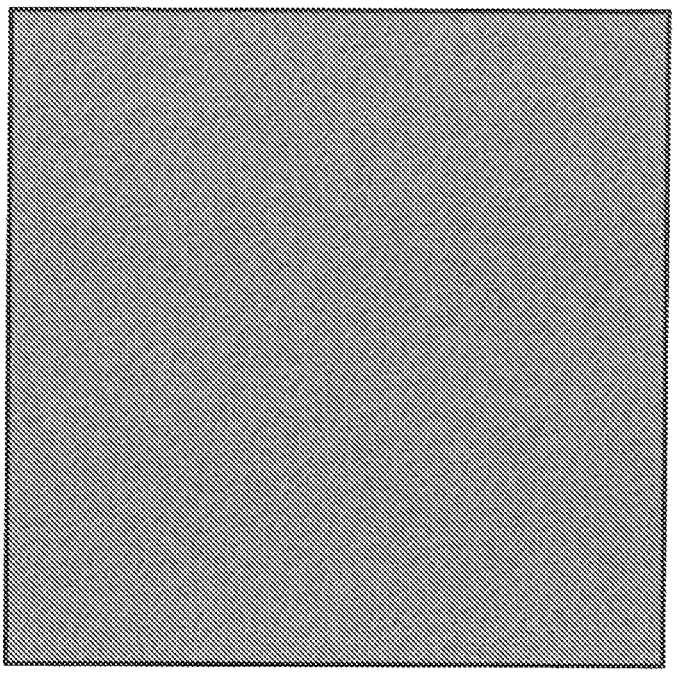
FIG. 5 illustrates an image captured by a fingerprint sensor where the object connecting the sensor is a rubber stamp.

With reference to FIG. 5, for a "perfect" sensor 102, surface 110 and material 111, an image captured by the sensor 102 of such a rubber stamp would be a uniformly black/grey, without any impairment data in the form of artefacts or noise present in the image, whereas in practice where the sensor 102, surface 110 and material 111 are subjected to impairments, impairment data forming some type of pattern is oftentimes present in the captured image.

For instance, in an embodiment, in case impairment data forming a linear slope is present in a captured image, an appropriately selected mathematical model for representing such impairment data could be a first-order polynomial:

$$P1(x,y)=c0+c1*x+c2*y$$

where coefficients c0, c1 and c2 are selected such that the first order polynomial correctly represents the linear slope formed by the impairment data in the captured image, and x and y represent x- and y-coordinates respectively of the captured image.

Figure 6:
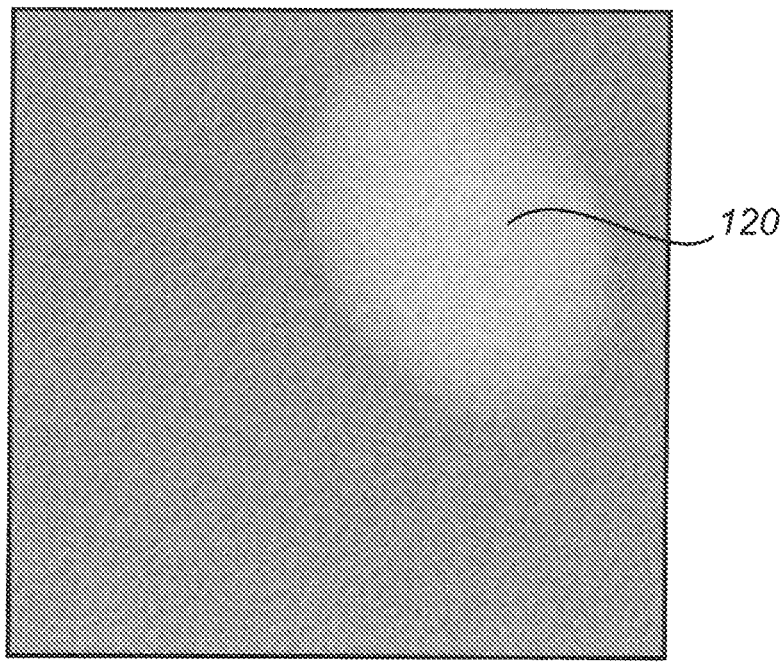
FIG. 6 illustrates the captured image of FIG. 5, but where the image further comprises impairment data.

FIG. 6 illustrates impairment data 120 present in the captured image in the form of impairment data arranged in a circular or elliptic pattern. This is a pattern which may be the result of an air pocket created in the glass/ceramic material 111 between the surface 110 of the fingerprint sensing area and the fingerprint sensor 102.

Such impairment data can be fitted to an elliptic radial base function such as:

$$Q(r)=c0*(1-\exp(-c1*r^2))$$

where $$r=1-q$$

and $$q=((x-c2)/c3)^2+((y-c4)/c5)^2$$

for x and y such that $((x-c2)/c3)^2+((y-c4)/c5)^2<1$ (thus x and y are inside an ellipse with center in (x,y)=(c2, c4) and with x-intercept in c3 and y-intercept in c5). Q=0 outside the ellipse. Thus, the impairment data 120 illustrated in FIG. 6 may be fitted to an elliptic function.

It is noted that the x-axis extends horizontally from the lower left corner of the captured image, while the y-axis extends vertically from the lower left corner of the captured image.

As previously mentioned, the impairments are mitigated in the art by storing the complete noise image and using the noise image in order to cancel out the corresponding impairment data in a subsequently captured image. A disadvantage of such an approach is that it requires a large memory for storing the entire noise image, typically in the range of kilobytes. This has a negative impact on system cost, miniaturization, system complexity and production yield. Further, in some systems, such as e.g. a smart card application, computing time may be too slow and/or power consumption too high for such a methodology to be practically possible to implement.

Figure 7:
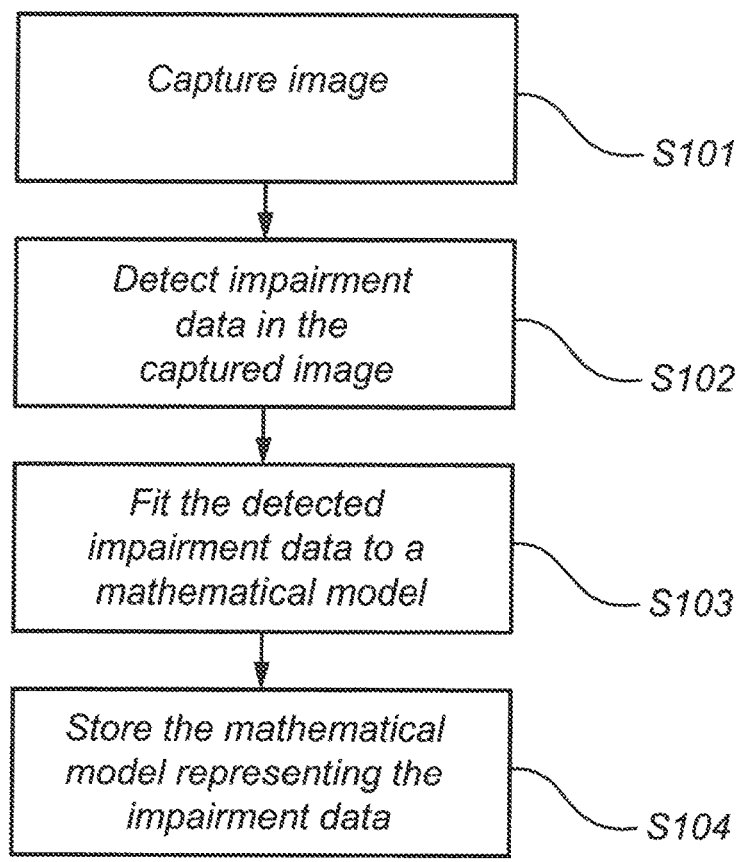
FIG. 7 illustrates a flowchart of the method of enabling cancelling out impairment data in a captured image according to an embodiment of the present invention.

FIG. 7 illustrates a flowchart of the method according to an embodiment of the present invention which solves this problem in the art by enabling cancelling out impairment data present in a captured image. Reference is further made to the fingerprint sensing system 101 of FIG. 3.

In a first step S101, the fingerprint sensor 102 captures an image of an object contacting the sensor 102. The object may be a user's finger or a rubber stamp. In the following with reference to FIGS. 5 and 6, the object will be exemplified in the form of a rubber stamp, an image of which was illustrated in FIG. 5. It is noted that several images may be captured, and that these images are averaged to produce a single image representing the rubber stamp (or the combined result of repeated finger touches).

Thereafter, in step S102, impairment data caused by impairments that the fingerprint sensor is subjected to is detected from the captured image by the processing unit 103 (or for instance by a computer in case the detection is performed in a production environment). Hence, with reference to the captured image of FIG. 6, the impairment data 120 forming the elliptic pattern in the captured image is detected.

Then, in step S103, the processing unit advantageously fits the detected impairment data 120 to an appropriately selected mathematical model. Thus, the impairment data is characterized using a mathematical model to which the impairment data is fitted. In this exemplifying embodiment, the previously discussed elliptic radial base functions will be used to represent the elliptical-shaped impairment data 120. This could be performed by a special-purpose calibration program run by the fingerprint sensing system. Advantageously, by executing such a program locally on the electronic device—e.g. a smart phone—implementing the fingerprint sensing, the level of security is dramatically increased, as the estimated mathematical model in such an embodiment never leaves the electronic device.

The fitting of the impairment data to the mathematical model may be performed using either linear or non-linear approaches, such as for instance maximum-likelihood or maximum a-posteriori estimations. Hence, the mathematical model to which the impairment data 120 is fitted in step S103 can subsequently be used to represent, and cancel out the impairment data present in a captured image.

Finally, in step s104, the mathematical model to which the detected impairment data is fitted, i.e. the appropriately selected coefficients c0, c1 and c2, is stored in the local memory 108 of the fingerprint sensor 102.

Subsequently, the mathematical model stored in the local memory 108 will be uploaded to host hardware, i.e. to the processing unit 103, where it advantageously can be used for cancelling out any impairment data present in a subsequently captured image, which greatly will improve the accuracy of the authentication process undertaken by the fingerprint sensing system 101.

Hence, a mathematical representation of the static noise caused by, for example, warpage, stack-up and material variations is created. Depending on the structure of the static noise present in a captured image, an optimal low order model, for example, polynomial, harmonic, radial, or other base functions, may be used to describe the static noise caused by impairments of the sensor 102 which are detected in the captured image.

Advantageously, impairment data in the form of e.g. low frequency static noise measured in a production test of the fingerprint sensor 102 is mathematically fitted to a low order model with only a few degrees of freedom (such as less than 20 Bytes), and subsequently the low order model is stored in the local memory 108 embedded in the sensor die.

It is noted that each individual fingerprint sensor typically generates more or less unique impairment data in a captured image. Thus, for each fingerprint sensor a unique mathematical model is created.

It is further noted that low frequency static noise may be measured at smart phone boot-up using a finger of the user as the object contacting the sensor, and even during normal use of the phone. Further, in practice, it may be necessary to capture a plurality of images of a rubber stamp or finger contacting the sensor in order to correctly measure any impairment data in the captured images.

A great advantage of capturing images of the user's finger during normal operation of the electronic device implementing the fingerprint sensing system is that the modelling can be gradually improved over time (if any refinements are possible). Furthermore, an added benefit of such an approach is that impairments changing over time (i.e. that the user breaks the cover glass of her smart phone) can be compensated for.

Further, it is envisaged that a small amount of fluid potentially could be applied onto the surface of the sensing area, in order to further improve quality of captured images in a dedicated calibration mode.

As mentioned hereinabove, a number of mathematical models can be envisaged depending on the impairment data to be represented, and cancelled out, by using an appropriate model.

1) Polynomials of order n (targeting no uniformity, warpage and other low frequency impairments), for example a first-order polynomial as described above or a second-order model:

$$P2(x,y)=c0+c1*x+c2*y+c3*x^2+c4*y^2+c5*x*y.$$

2) Harmonic functions (targeting periodic impairments for a fixed number of frequencies), for example:

$$H(x,y)=c0*\sin(c1*x)*\sin(c2*y).$$

It can further be envisaged that linear combinations of the base functions are utilized, for example:

$$P3(x,y)=H1(x,y)+H2(x,y)+Q1(r)+Q2(r)$$

In another embodiment of the invention, the mathematical approximation is based upon a wavelet function. This could be obtained by using a discrete wavelet transformation which in the one dimensional case would be a function of the form:

$$\psi_{j,k}(x)=2^{j/2}\psi(2^j x-k)$$

for integers j, k that spans the space $W_j$. Extensions to the 2D case can be found in several image processing books such as J. P. Antoine, R. Murenzi, P. Vandergheynst and S. T. Ali, "Two Dimensional Wavelets and Their Relatives," Cambridge University Press, Cambridge, 2004.

Now, after impairment data has been fitted to an appropriate mathematical model, which model is stored in the local memory 108 of the fingerprint sensor 102, the stored mathematical model may be used by the processing unit 103 of the host, i.e. the smart phone 100, to represent—and cancel out—impairment data present in a subsequently captured image representing a fingerprint to be compared with a fingerprint template stored in the memory 105 in order to have the smart phone 100 perform a desired action, such as transitioning from locked mode to unlocked mode, in which the user is allowed access to the smart phone 100.

In an embodiment, the mathematical model is stored in a memory (not shown) of the fingerprint sensing system 101, which memory is external from the actual sensor 102 (in contrast to the OTP 108 which is on-chip with the sensor 102). Advantageously, besides providing for a greater storage capacity, adding an external memory avoids storing the created mathematical model in the host device. Further advantageous is that in situations where there is a need to replace the fingerprint sensor 102 with a new sensor, the mathematical impairment data model is stored need not be derived again by performing further tests, since the already created model can be acquired from the external memory upon connection of the new sensor to the memory.

Figure 8:
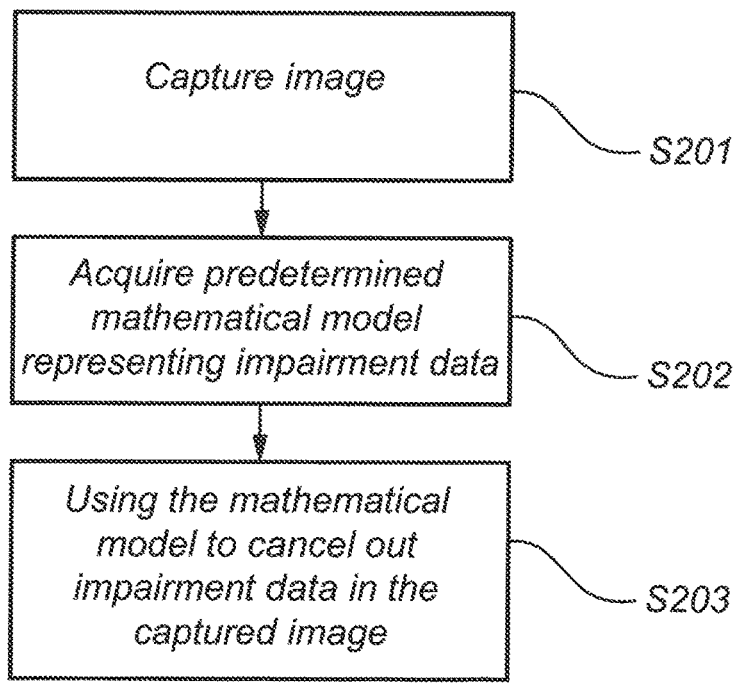
FIG. 8 illustrates a flowchart of the method of cancelling out impairment data in a captured image according to an embodiment of the present invention.

FIG. 8 illustrates a flowchart of the method according to an embodiment of the invention of cancelling out impairment data in a captured image after the mathematical model has been created and stored in the memory 108 of the fingerprint sensor 102. Reference is further made to the fingerprint sensing system 101 of FIG. 3.

In a first step S201, the fingerprint sensor 102 captures an image of an object contacting the sensor 102. During normal operation of the smart phone 100, this object is typically a finger of a user of the smart phone. Since the impairment data relates to static noise, the impairment data that was fitted to a selected mathematical model during e.g. a production test of the fingerprint sensor 102 is still present in any subsequently captured image, as is illustrated in FIG. 9 and again denoted 120 (assuming that the impairment data has the elliptic structure as is illustrated in FIG. 6).

Thereafter, in step S202, the processing unit 103 acquires the predetermined mathematical model representing the impairment data present in the captured image, which is stored in the sensor memory 108.

The processing unit 103 subsequently uses the acquired predetermined mathematical model to at least partly cancel out the impairment data present in the captured image.

In an embodiment, in case the impairment data is of an additive type, the processing unit 103 subtracts the impairment data represented by the acquired predetermined mathematical model from the impairment data present in the captured image, wherein the impairment data present in the captured image is cancelled out.

Figure 10:
FIG. 10 illustrates the captured fingerprint of FIG. 9, where the impairment data has been cancelled out.

As a result, with reference to FIG. 10, an image representing a "clean" fingerprint is obtained.

In another embodiment, in case the impairment data is of a multiplicative type, the processing unit 103 divides the impairment data present in the captured image with the impairment data represented by the acquired predetermined mathematical model, wherein the impairment data present in the captured image is cancelled out.

As a result, again with reference to FIG. 10, an image representing a clean fingerprint is obtained.

In yet another embodiment, image processing is not necessarily performed. Instead, the processing unit 103 acquires the predetermined mathematical model stored in the local memory 108 of the fingerprint sensor 102 and accordingly controls the fingerprint sensor 102 to adjust its settings upon capturing the image in order to compensate for the impairment data represented by the acquired predetermined mathematical model, thereby at least partly cancelling out the impairment data present in the captured image.

Figure 9:
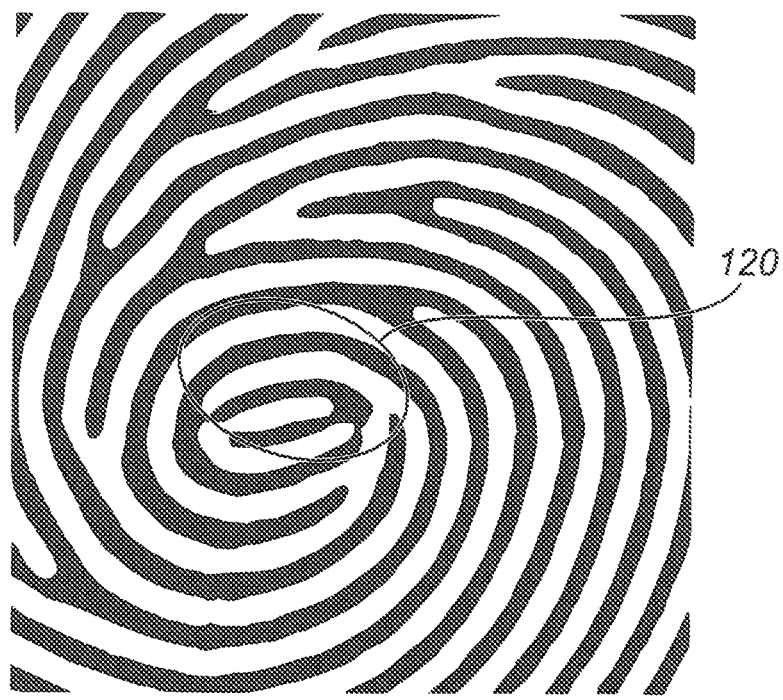
FIG. 9 illustrates a captured image of a fingerprint, which image further comprises impairment data.

For instance, again with reference to the impairment data present in the captured image illustrated in FIG. 9, any one or more out of a number of sensor parameters may be adjusted, such as e.g. pixel sensitivity, as will be discussed in the following.

Assuming for instance that the impairment data 120 is a result of variation in the stack-up height of the material 111 between the surface 110 of the sensing area and the fingerprint sensor 102; since the attenuation of a sensed signal is greater at pixels where the stack-up is high, it may be possible to cancel out the impairment data at these pixels by increasing the pixel sensitivity accordingly. Hence, by appropriately controlling the sensor settings based on the predetermined mathematical model representing the impairment data, a "clean" fingerprint as illustrated in FIG. 10 may advantageously be obtained by the fingerprint sensor 102.

It is envisaged that that different pixel sensitivities can be used for different locations of the pixel matrix of the sensor 102, where each location comprises at least one pixel, even though in practice a cluster of tens or hundreds of pixels is addressed with one pixel sensitivity while another cluster is addressed with another pixel sensitivity.

In an alternative embodiment, the processing unit 103 is configured to assign a lesser weight to fingerprint features extracted from areas of the captured image indicated by the acquired predetermined mathematical model to comprise impairment data. Hence, areas of the captured image being affected by impairments are advantageously taken into account to a lower degree (or possibly not at all) as compared to the areas of the image where no impairments are present and where the extracted fingerprint features thus can be more relied upon.

In still an embodiment, the fingerprint sensor 102 is configured to perform extended sensing of the object contacting the sensor at areas of the sensor 102 indicated by the acquired predetermined mathematical model to comprise impairment data, which advantageously will result in a captured image where the impairment data at least partly is cancelled out. The extended sensing may e.g. be performed by sensing any impairment-affected pixels multiple times and deriving a pixel intensity being an average of the multiple measurements, or by capturing multiple images and performing an average of the multiple images. Alternatively, one pixel measurement or complete captured image out of the plurality of pixel measurements/captured images is determined to best represent the object contacting the sensor, wherein that measure pixel/captured image is selected.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a fingerprint sensing system of enabling cancelling out impairment data present in an image captured by a fingerprint sensor of the fingerprint sensing system, comprising:
    capturing an image of an object contacting the fingerprint sensor;
    detecting, from the captured image, impairment data caused by static impairments of the fingerprint sensor;
    fitting the detected impairment data to a selected mathematical model; and
    storing the mathematical model to which the detected impairment data is fitted, wherein the model can be used subsequently for at least partly cancelling out capacitive static noise present in an image captured by the fingerprint sensor.

2. A method of a fingerprint sensing system of cancelling out impairment data present in an image captured by a fingerprint sensor of the fingerprint sensing system, comprising:
    capturing an image of an object contacting the fingerprint sensor;
    acquiring a stored predetermined mathematical model representing impairment data present in the captured image, which impairment data is caused by static impairments of the fingerprint sensor; and
    using the acquired predetermined mathematical model to at least partly cancel out the capacitive static noise present in the captured image.

3. The method of claim 2, wherein the step of using the acquired predetermined mathematical model to at least partly cancel out the capacitive static noise present in the captured image comprises:
    adjusting fingerprint sensor settings upon capturing the image in order to compensate for the impairment data represented by the acquired predetermined mathematical model, thereby at least partly cancelling out the capacitive static noise present in the captured image.

4. The method of claim 3, wherein the adjusting of fingerprint sensor settings comprises adjusting sensitivity of pixels of the sensor to compensate for the impairment data.

5. The method of claim 4, wherein the adjusting of fingerprint sensor further comprises:
    adjusting sensitivity of pixels of the sensor such that different clusters of pixels are adjusted to have different pixel sensitivity.

6. The method of claim 2, wherein the step of using the acquired predetermined mathematical model to at least partly cancel out the capacitive static noise present in the captured image comprises:
    subtracting the impairment data represented by the acquired predetermined mathematical model from the impairment data present in the captured image.

7. The method of claim 2, wherein the step of using the acquired predetermined mathematical model to at least partly cancel out the capacitive static noise present in the captured image comprises:
    dividing the impairment data present in the captured image with the impairment data represented by the acquired predetermined mathematical model.

8. The method of claim 2, wherein the step of using the acquired predetermined mathematical model to at least partly cancel out the capacitive static noise present in the captured image comprises:
    assigning a lesser weight to fingerprint features extracted from areas of the captured image indicated by the acquired predetermined mathematical model to comprise impairment data.

9. The method of claim 2, wherein the step of using the acquired predetermined mathematical model to at least partly cancel out the capacitive static noise present in the captured image comprises:
    performing supplementary sensing of the object contacting the fingerprint sensor at areas of the fingerprint sensor indicated by the acquired predetermined mathematical model to comprise impairment data.

10. A fingerprint sensing system comprising a fingerprint sensor and a processing unit, the fingerprint sensing system being configured to enabling cancelling out impairment data present in an image captured by a fingerprint sensor of the fingerprint sensing system,
    the fingerprint sensor being configured to:
        capture an image of an object contacting the fingerprint sensor;
    the processing unit being configured to:
        detect, from the captured image, impairment data caused by static impairments of the fingerprint sensor;
        fit the detected impairment data to a selected mathematical model; and
        store the mathematical model to which the detected impairment data is fitted, wherein the model can be used subsequently for at least partly cancelling out capacitive static noise present in an image captured by the fingerprint sensor.

11. A fingerprint sensing system comprising a fingerprint sensor and a processing unit, the fingerprint sensing system being configured to cancelling out capacitive static noise present in an image captured by a fingerprint sensor of the fingerprint sensing system,
    the fingerprint sensor being configured to:
        capture an image of an object contacting the fingerprint sensor;
    the processing unit being configured to:
        acquire a stored predetermined mathematical model representing impairment data present in the captured image, which impairment data is caused by static impairments of the fingerprint sensor; and use the acquired predetermined mathematical model to at least partly cancel out the capacitive static noise present in the captured image.

12. The fingerprint sensing system of claim 11, the processing unit being configured to, when using the acquired predetermined mathematical model to at least partly cancel out the capacitive static noise present in the captured image:
adjust fingerprint sensor settings upon capturing the image in order to compensate for the impairment data represented by the acquired predetermined mathematical model, thereby at least partly cancelling out the capacitive static noise present in the captured image.

13. The fingerprint sensing system of claim 12, wherein the processing unit is configured to, when adjusting the fingerprint sensor settings:
adjust sensitivity of pixels of the sensor to compensate for the impairment data.

14. The fingerprint sensing system of claim 12, wherein the processing unit is configured to, when adjusting the fingerprint sensor settings:
adjust sensitivity of pixels of the sensor such that different clusters of pixels are adjusted to have different pixel sensitivity.

15. The fingerprint sensing system of claim 11, wherein the processing unit is configured to, when using the acquired predetermined mathematical model to at least partly cancel out the capacitive static noise present in the captured image:
subtract the impairment data represented by the acquired predetermined mathematical model from the impairment data present in the captured image.

16. The fingerprint sensing system of claim 11, wherein the processing unit is configured to, when using the acquired predetermined mathematical model to at least partly cancel out the capacitive static noise present in the captured image:
divide the impairment data present in the captured image with the impairment data represented by the acquired predetermined mathematical model.

17. The fingerprint sensing system of claim 11, wherein the processing unit is configured to, when using the acquired predetermined mathematical model to at least partly cancel out the capacitive static noise present in the captured image:
assign a lesser weight to fingerprint features extracted from areas of the captured image indicated by the acquired predetermined mathematical model to comprise impairment data.

18. The fingerprint sensing system of claim 11, wherein the processing unit is configured to, when using the acquired predetermined mathematical model to at least partly cancel out the capacitive static noise present in the captured image:
perform supplementary sensing of the object contacting the fingerprint sensor at areas of the fingerprint sensor indicated by the acquired predetermined mathematical model to comprise impairment data.

19. A non-transitory computer readable medium comprising computer-executable instructions for causing the fingerprint sensing system to perform steps recited in claim 2 when the computer-executable instructions are executed on a processing unit included in the fingerprint sensing system.

* * * * *